United States Patent [19]
Ondrick

[11] Patent Number: 5,217,612
[45] Date of Patent: Jun. 8, 1993

[54] APPARATUS FOR DIFFUSION DIALYSIS

[75] Inventor: Edwin P. Ondrick, Westfield, Mass.

[73] Assignee: Poly-Plating, Inc., Chicopee, Mass.

[21] Appl. No.: 906,762

[22] Filed: Jun. 30, 1992

[51] Int. Cl.$^5$ .............................................. B01D 61/28
[52] U.S. Cl. ............................ 210/321.75; 210/321.84
[58] Field of Search ................ 210/634, 641, 644–647, 210/321.6, 321.64, 321.65, 321.66, 321.71, 321.72, 321.75, 321.84

[56] References Cited

U.S. PATENT DOCUMENTS 5,062,960 11/1991 Aoki et al. ...................... 210/321.75

Primary Examiner—Frank Sever
Attorney, Agent, or Firm—McCormick, Paulding & Huber

[57] ABSTRACT

Diffusion dialysis system which is decontaminated acids which have been contaminated with metal ions, such as during plating operations and the like. The system includes a plurality of vertically stacked, horizontally disposed anion exchange cells. Each cell includes the anion exchange membrane adapted to permit the diffusion of anions and to block the diffusion of cations therethrough. The system includes a frame which supports one supply tank for holding water and another supply tank for holding the waste acid each disposed at a level higher than the stack of anion exchange cells so that the water and acid will have a head of static pressure. Each cell of the stack includes channels for supplying waste acid to one side of the membrane and water to the opposite side of the membrane and at the opposite ends thereof to provide for the counterflow of acid and water across the upper and lower surfaces of each membrane. An open-network grid on each side of each membrane to cause turbulence in the flow of the water and waste acid. A supply conduit is connected from the acid tank to the upper cell of the stack and another conduit is connected to supply water to the bottom cell of the stack. An output conduit is connected from the acid side of the bottom cell to the suction side of a vacuum pump. Another conduit is connected from the water side of the top cell to the suction side of a second pump. The static pressure and the vacuum pumps cause the acid and the water each to be drawn at a uniform rate through the cells of the stack for the diffusion dialysis process.

5 Claims, 3 Drawing Sheets

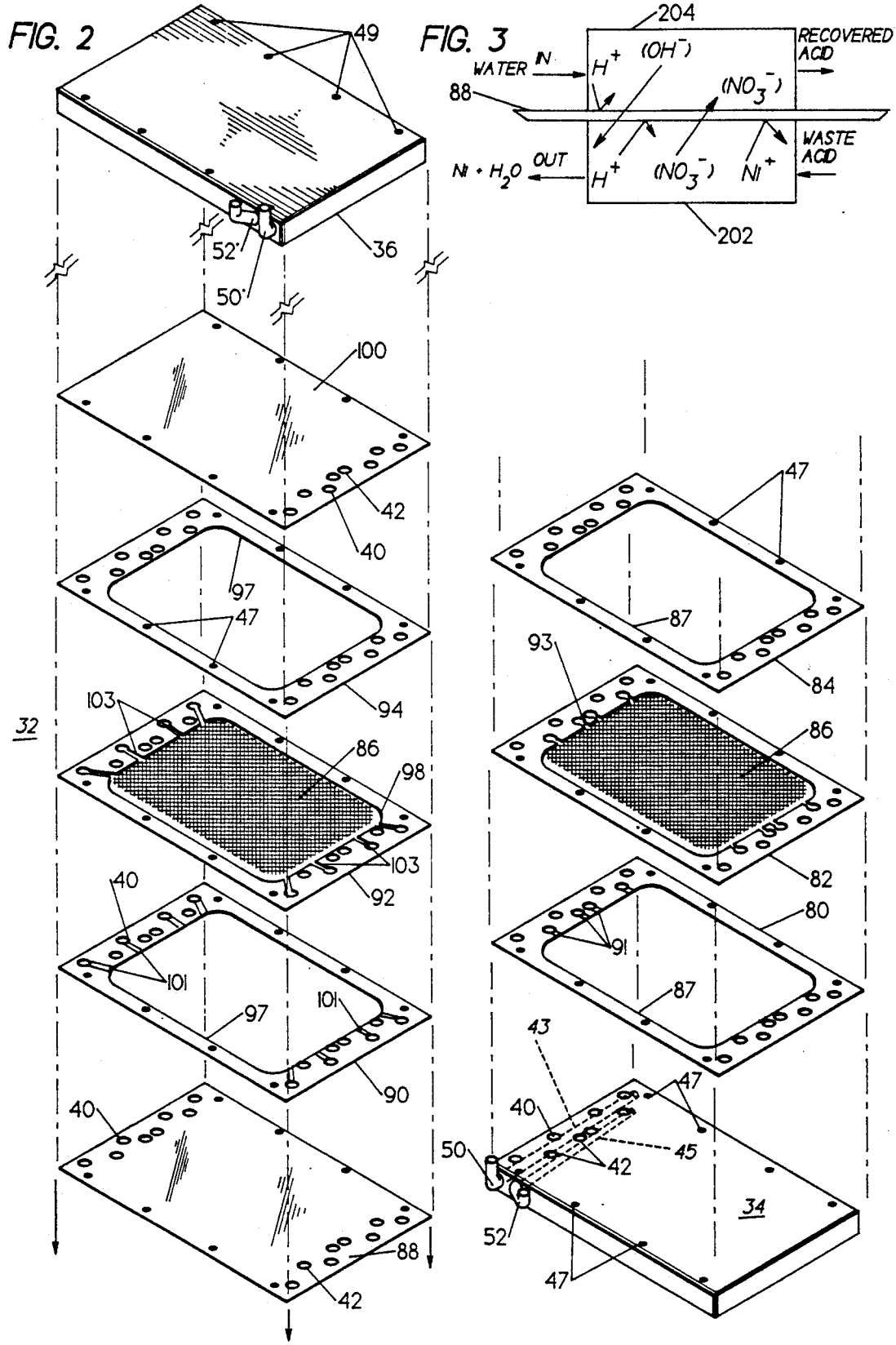

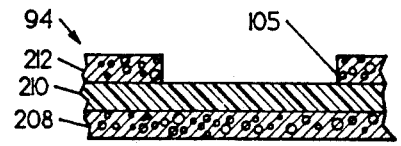
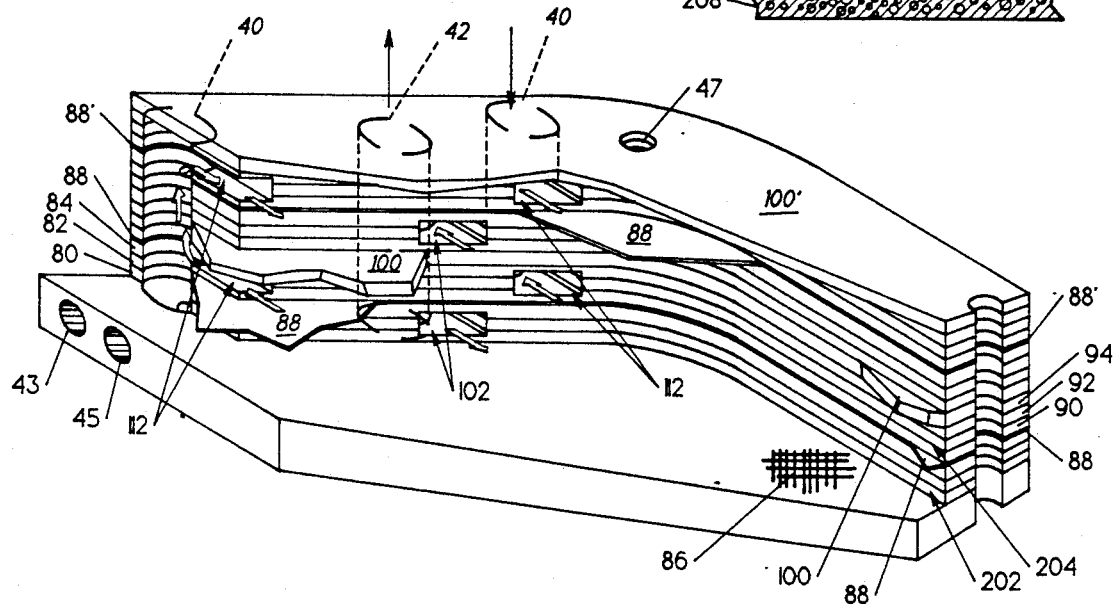
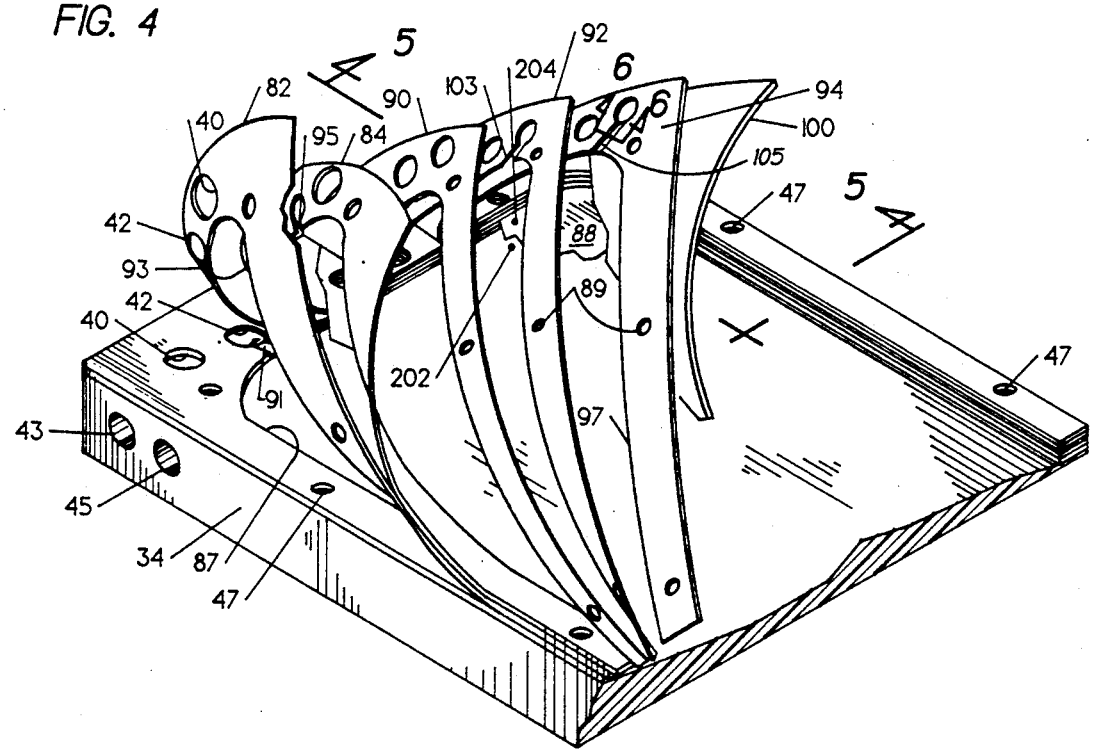

APPARATUS FOR DIFFUSION DIALYSIS

This invention relates to an apparatus for recovering acid from an acid containing waste liquor thereby to eliminate or minimize the problems of disposing of contaminated acids from metal plating plants.

BACKGROUND OF THE INVENTION

While the use of anion exchange membranes in diffusion dialysis for separating metal ion contaminants from the plating acid has been known for some time, such as disclosed in U.S. Pat. No. 5,062,960 to Asahi Glass Company, Ltd., discloses an apparatus for recovering acid by diffusion dialysis using anionic exchange membranes. This patent discloses the need for cooling compartments disposed between each pair of adjacent membranes "A." The construction and the assembly as described in the cryptic disclosure of the '960 Patent, fails to teach any particular orientation of the anionic exchange membrane cells and of the means by which the fluids are caused to flow through the cells, although the cells are depicted in vertical or upright orientation. In essence, such methods have not been found generally effective for a variety of reasons related to the construction operation of the apparatus used to perform those methods.

Therefore, it is the object of this invention to provide an improved apparatus for separating metallic ions from contaminated acids which result in metal plating processes to achieve improved recovery rates without the necessity of cooling compartments whereby the material and environmental costs and the other costs and problems incident to the disposal of contaminated acids are virtually eliminated.

A further object of this invention is to provide an apparatus of the above type that is simple and effective in its operation which provides improved performance over the heretofore available apparatus for carrying out such processes.

Another further object of this invention is to provide an apparatus capable of recovering at generally uniform flow rates, a relatively uncontaminated acid from a contaminated or waste acid containing metal ions dissolved therein, such as result in metal plating processes whereby the recovered acid is adapted for repeated usage in metal plating processes.

SUMMARY OF THE PRESENT INVENTION

Contaminated acid and water are each drawn by vacuum through a horizontal stack of anion exchange membranes. The acid and water are controlled to flow at uniform rates in opposite directions and on opposite sides of each membrane wherein the resulting output is a relatively uncontaminated acid of approximately ninety percent (90%) purity which is adapted for reuse in plating processes.

This invention and the above and other objects and advantages of this invention will be more readily apparent from the following description read in conjunction with the accompanying drawings, in which:

BRIEF DESCRIPTION OF THE DRAWINGS

FIG. 2 is an exploded view of discrete layers which comprise each cell of anion exchange membranes embodying this invention;

FIG. 3 is a diagrammatical view illustrating the operation of the anion exchange membrane of the type embodying this invention;

FIG. 4 is a partial perspective view, on an enlarged scale, with discrete portions thereof oriented to illustrate the multi-layer construction of the anion exchange cells;

FIG. 5 is a perspective view taken along line 5—5 of FIG. 4, and

FIG. 6 is a cross-sectional view, on a greatly enlarged scale, taken along line 6—6 of FIG. 5.

Figure 1:
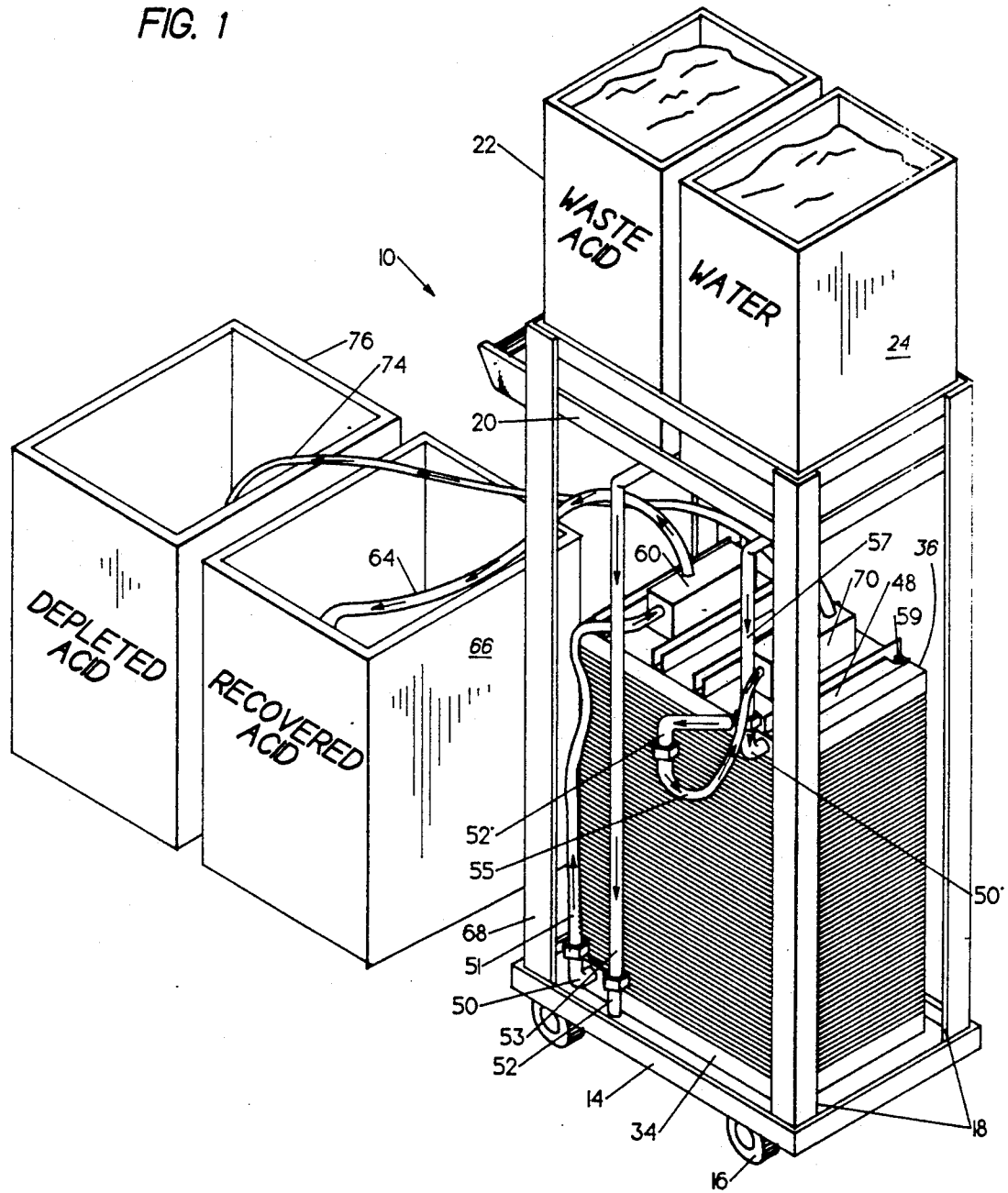
FIG. 1 is a perspective view of an apparatus of the type embodying this invention.

Referring now in detail to the drawings, in FIG. 1 is shown generally at 10 an apparatus or system for recovering, in pure form, an acid such as nitric, hydrofluoric, hydrochloric, phosphoric and sulfuric acids as used in metal processing and, as a result, has picked up metal cations, such as chromium, iron or nickel, for example. "Cations" are positively charged particles which are attracted to a cathode or negatively charged electrode.

The apparatus comprises a framework 12 adapted to support reservoirs 22 and 24 of a contaminated or waste acid to be decontaminated by dialysis with water. A stack 30 of anion exchange membranes is supported by the apparatus below the liquid reservoirs. The output fluids are recovered as pure acid in tank 66 and the metallic contaminants or "depleted" acid in tank 76. The framework includes a shelf or base 14 supported rollers or wheels 16 to enable the unit to be moved conveniently about the plant or site at which the apparatus is located. A stanchion or upright member 18 extends from each corner of the base plate and may be in the form of an angle iron, as shown. Adjacent its upper end, the frame includes a second shelf or tray 20 disposed for supporting the tanks, reservoirs or containers 22 and 24, one being adapted to receive and hold water and the other, an acid, such as nitric ($HN_3$) contaminated by metallic ions, such as nickel (Ni). The tanks are disposed at a height so that the liquids will have a static head of pressure sufficient to charge the cells with waste acid and water. Means such as a ball float, check-valve (not shown) may be provided to maintain the liquid level in each tank. the lower base 14 of the frame supports a stack 30 of anion exchange membranes or cells 32 which are firmly clamped between a lower clamping plate or header 34 of an upper clamping plate or header 36.

The lower header 34 is provided at one end with a first set of holes 40 adjacent the edge of the one end thereof and a second set 42 inwardly of the first set. Holes 40 communicate with a bore or conduit 43 drilled laterally into the header 34 from one side edge thereof for connection by means of an elbow or fitting 50. Holes 42 are disposed to communicate with another lateral bore 45 also provided in the header 34 and is to be connected to an elbow or fitting 52. Fittings 50 and 52 are connected to conduits 51 and 53, respectively. The other end of conduit 51 is connected to the suction end of a vacuum pump 60 and the other end of conduit 53 is connected to tank 22. The upper header 36 is the mirror image of the lower header 34 and includes an outer set of holes 40 and an inner set of holes 42 disposed on the end thereof opposite that of the lower header. The two sets of holes, each communicate with lateral bores 43 and 45 in the same manner as described above with respect to the lower header 34 and by fittings 50' and 52' are connected to the outer holes 40 and inner holes 42, respectively, and to conduits 55 and 57. Along both side edges, the lower header 34 includes a plurality of holes 47 each adapted to receive therethrough the lower end portions of each rod or bolt 59 (FIG. 1) externally threaded for receiving thereon a nut (not shown). The upper header 36 includes correspondingly located unthreaded holes 49 adapted to receive therethrough the upper ends of the rods or bolts 59. U-shaped clamping plates 48 are disposed in spaced-relation across the upper surface of the header 36. The horizontal panel of each plate includes a hole (not shown) adjacent its outer edge to receive the rods or bolts 59 (FIG. 1) so that when the nuts, screw-fitted on the lower ends of bolts 59, are tightened down, the plates 48 will exert uniform clamping forces on the stack of cells over generally the entire area thereof whereby the edges of the stack will be sealed in liquid tight relationship.

Vacuum pump 60 is disposed on the upper surface of the upper header 36, its inlet or suction end is connected by the tubular conduit 51 to the fitting 50 disposed on the lower header 34. The outlet or high pressure side of the vacuum pump 60 is connected by means of a tubular conduit 64 to the tank 66 used for receiving the decontaminated or "recovered" acid. A second vacuum pump 70 is also disposed on the upper surface of the top header 36 and includes an inlet or suction end connected by conduit 55 to fitting 52'. A conduit 57 is connected at its upper end to water tank 24 and at its lower end, to fitting 50'. The fitting 52' extends from the top header 36 for receiving the depleted acid from the cell stack 30 and which by vacuum pump 60, is drawn through conduit 55 connected to the inlet or suction side of pump 70. The outlet or high pressure side of the pump 70 is connected by a conduit 74 to a tank 76 adapted to receive the depleted acid. The water can be evaporated and the reconcentrated acid rerun through the system until its metallic concentration is sufficient for economical recovery.

Each cell 32 of the stack 30, as depicted in FIG. 2, comprises an anion exchange membrane 88 sandwiched between a lower chamber formed by plurality of gaskets 80, 82 and 84 on one side of the membrane 88 and an upper chamber formed by gaskets 90, 92 and 94 on the other side thereof. The anion exchange membranes may be of the type available commercially from Tokuyama Soda, Ltd., or from Ashahi Glass Company, Ltd., both located in Tokyo, Japan. Each of the three gaskets is generally rectangular in shape and their inner edges define central openings 87 which, when stacked in superimposed relation, form chambers 202 and 204 (FIG. 4) of about 0.250 inches in height prior to compression. Along the side edges, the gaskets are each provided with holes 47 for receiving the clamping bolts 59 therethrough which extend from the upper to the lower header for clamping the stack in assembled relation. At each end of each of the gaskets, correspondingly located holes 40 are provided adjacent the outer end edge of the gaskets and corresponding located holes 42 are disposed adjacent the inner end edge of the gaskets. When gaskets are vertically stacked in superimposed edge-to-edge relation, the holes 40 and 42 will be in vertical alignment and form two sets of four vertical conduits, one set 42 for the acid and the other set 40 for the water flow. The gasket holes correspond in location and size to the holes 40 and 42 provided in the upper and lower headers which are adapted to receive the waste acid and the water to be used in the dialysis process. In each cell, gaskets 80 and 84 and 90 and 94, for example, comprises outer elastomeric layers, as at 208 and 212 (FIG. 6) of a closed cell foam or cellular material formed on opposite surfaces of an intermediate layer, as at 210, of a noncellular, resiliently flexible but relatively stiff synthetic plastic sheet material, which is essentially form stable. Portions of the cellular material, as at 212 in FIG. 6, may be selectively cut away to form portions of lateral channels 91 and 105 (FIG. 4) which extend from the vertical conduits formed by holes 40 and 42 into the central openings 87 and 97 of the gaskets which form the flow channels 102 and 112 (FIG. 5) within each cell 32.

A porous, open-network or grid member 86 which may be in the form of a screen-like material of acid-resistant copolymer, is disposed in the chamber on each side of the membrane 88 and has a maximum thickness on the order of 0.0625 inches and is adapted to impart turbulence to the liquid flowing in each chamber 202 and 204. It has been found that the grid members 86 serve to improve the operation of the anionic exchange membranes 88 by agitating water and acid flow on opposite sides of the membrane 88 thereby disrupting the laminar flow of the liquids. The anionic exchange membrane 88, except that it has no central opening, is otherwise perforated in the identical manner as the gaskets 80–84 and provides for the exchange or diffusion therethrough of anions, such as $NO_3^-$ and $OH^-$ from the acid through the membrane in one direction while preventing the flow therethrough of the cations, such as $Ni^+$ and $H^+$, as illustrated in FIG. 3. On the opposite side of the membrane 88, as previously described, are three additional gaskets 90, 92 and 94, of identical construction to gaskets 80, 82 and 84, are provided as well as an additional open-network member 86. Disposed on top of the stack of nine elements, is what is known as a "switch-back plate" or barrier member with apertures 40 and 42 disposed at one end only. A switch-back plate is formed of a relatively stiff plastic material disposed at the upper end of each cell 32 and each successive plate is reversed from end-to-end so that the holes 40 and 42 are alternately disposed at opposite ends of the stack 30. The plate 100 thereby serves to provide for the reversal in the direction of flow of the water and acid as those liquids are drawn by the vacuum pumps 60 and 70 through each successive cell of the stack 30.

As best depicted in FIGS. 4 and 6, a recess 91 extends from each hole 42 at both ends of the gasket and communicates with the interior rectangular opening 87 of the gaskets 80 and is formed by removal of a narrow strip portion of the elastomeric layer, as at 212 in FIG. 6. A cutout 93 extends from each of the holes 42 in the plastic gasket member 82 and a downwardly opening recess 95 extends from each hole 42 of the gasket 84. The oppositely facing recesses 91 and 95 and cutout 93 are disposed to define a channel 102 extending from each hole 42 to the central opening 87 or chamber 202 of the assembly. It should be noted that channels 102 extend from each of the holes 42 at each end of the gaskets 80, 82 and 84 to provide for fluid flow from the holes 42 into internal chamber 202 below each membrane.

The anion exchange membrane 88 includes openings 40 and 42 at both ends which correspond with the openings in the gasket members but does not include any lateral channels. For this reason, any waste acid which enters into the laterally, extending bore 45 of the lower header and flows in holes 42 will, as shown, traverse from left-to-right in the drawings on the underside of the anion exchange membrane 88. On the opposite or upper side of the anion exchange membrane 88, gasket members 90, 92 and 94 are essentially the same as the gasket members 80, 82 and 84, except for the fact that there are lateral channels which extend only from the outer holes 40 into the openings 97 of these gaskets. The channels are formed by an upwardly opening recess 101 (FIG. 2) formed on the gasket 90 and opening and extending in communication with the inner opening 97. Gasket member 92 includes cutouts 103 which extends from the opening 40 at both ends of the gasket into the inner openings 97 of that gasket and finally the gasket 94, includes downwardly, opening recesses 105 (FIG. 4) which corresponds in location with the other recess 101 and cutout 103 to form three-ply channels 112 extending from the holes 40 into the inner chamber 204 defined by the three superimposed gaskets 90, 92 and 94. In this way, the water which is flowing from the tank 24 into the upper header 36, will flow downwardly in bores 40 and laterally via channels 112 into the rectangular chambers 204 on the upper side of the diaphragms 88, and out of each chamber 204 via channels 112 in a direction opposite that of the acid flow. This counterflow pattern is repeated with each cell of the stack. Each cell is terminated by a switch-back plate 100 which includes holes 40 and 42 only at one end thereof opposite the end that the holes are located in the adjacent switch-back plate thereby causing reversal of the direction of the flow of both the acid and from one cell to the next cell. Each cell of the stack comprises gaskets 80, 82, 84, 90, 92 and 94, two grid members 86, an anionic membrane 88 and a switch-back plate 100 with flow holes 40 and 42 alternately positioned to the right and left side of the stack to effect this reversal of flow after the fluid traverses each cell of the membrane.

It has been found that with the above-described horizontal orientation of the anionic membrane cells when combined with the use of vacuum pumps connected to the outlet ends of the stacked cells, a generally uniform flow rate of both the contaminated acid and water will be obtained and that no cooling chambers are required.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of sill in the art.

Having thus described my invention, what is claimed is:

1. Diffusion dialysis system for decontamination of an acid used in metal coating processes and which has been contaminated with metallic ions, the system comprising a plurality of horizontally disposed anionic exchange cells arranged in superposed, edge-to-edge and vertically stacked relationship for purifying the acid by removing the metallic ions, each cell including at least one anionic exchange membrane, a first chamber disposed on the upper side of said membrane and a second chamber disposed on the lower side thereof, input conduits connected to supply water and the contaminated acid to opposite vertical ends of the stack cells means for providing and alternative to cooling compartments disposed between adjacent chambers and including channels connected to provide for the counterflow of the liquid acid and the liquid water in said first and second chambers of each cell, one of the two liquids being channeled to flow from the top to the bottom of said stack of cells and the other to flow from the bottom to the top thereof and one output conduit connected to receive the purified acid after processing through the stacked cells and another output conduit to receive metallic ions dissolved in dilute acid and which have been removed from the contaminated acid, the output conduits being connected to the opposite vertical ends of the stack from the input ends for the contaminated acid and water, said output conduits each being connected to the suction side of a means which serves to draw the acid and water through each of the cells of the stack, said means having an imput end connected to said output conduits and an output end for discharging the pure acid and metal ions in dilute acid removed therefrom.

2. Diffusion dialysis system as set forth in claim 1, which each chamber on the opposite side of each diaphragm includes an open-network member to provide turbulence in the flow of liquid in the chambers.

3. Diffusion dialysis system, as set forth in claim 2, in which the contaminated acid and water are supplied from tanks disposed at a height substantially above the anionic exchange cells so that the acid and water will have a head of pressure for flow in the input conduits connected to the opposite ends of said stack of cells.

4. Diffusion dialysis system, as set forth in claim 3, in which each cell comprises the anionic exchange member, a plurality of gaskets disposed on opposite sides of said membrane, the gaskets when stacked providing said first chamber on the upper sides of the membrane and said second chamber on the underside thereof, said gaskets being channeled to provide flow of acid in one direction and water in the opposite direction in said chambers of each cell, each of said cells comprising at its upper end, a switch-back plate including perforations at one end thereof alternately disposed at opposite ends of said stack to provide for reversal of the direction of flow through each succeeding cell of said stack of cells.

5. Diffusion dialysis system, as set forth in claim 4, in which said system comprises an apparatus having a wheel supported frame permitting movement thereof, the apparatus having a first level on which said stack of cells are disposed and a second level on which are disposed a tank to hold the water and another tank to hold the contaminated acid at a height greater than said stack, the stack including an upper and a lower header and with the gaskets and the anionic exchange membranes clamped between the headers in a liquid sealing relationship, the clamping thereof being effected by means of a plurality of pressure plates disposed on the upper surface of the upper header and a plurality of bolts extending through the upper header through corresponding edge portions of each of the membranes and gaskets, the opposite end of said bolts being secured to the lower header of the assembly, some of said gaskets including a layer of elastomeric material adapted to provide a liquid-tight seal when clamped between said headers.

* * * * *